B. BARLOW.
CULTURE STARTER MAILING PACKET AND METHOD FOR MAKING THE SAME.
APPLICATION FILED SEPT. 15, 1914.
1,160,818.
Patented Nov. 16, 1915.
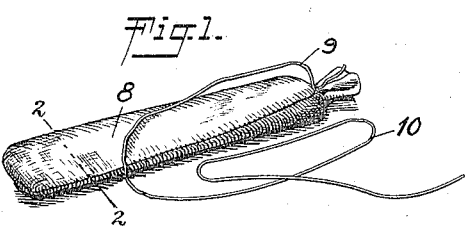
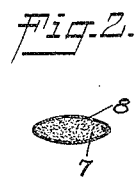
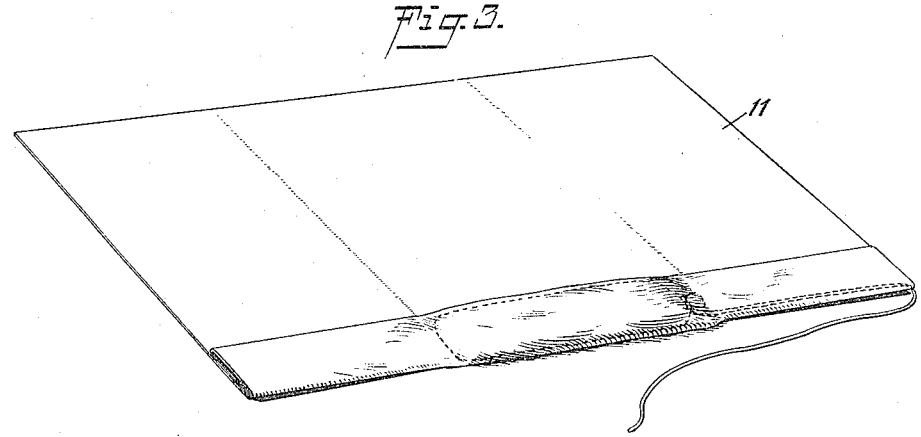
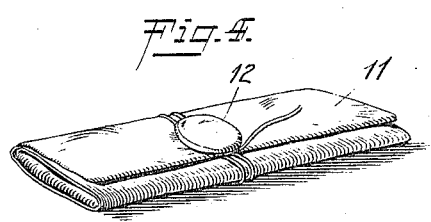
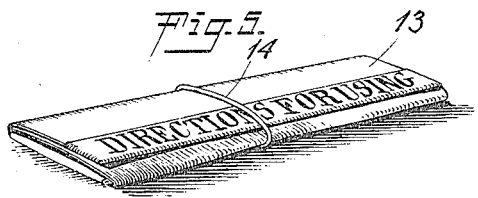
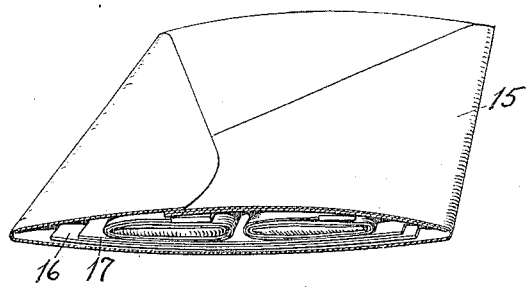
WITNESSES
INVENTOR
Bronson Barlow
BY
ATTORNEYS

UNITED STATES PATENT OFFICE.

BRONSON BARLOW, OF CHICAGO, ILLINOIS.

CULTURE-STARTER-MAILING PACKET AND METHOD FOR MAKING THE SAME.

1,160,818.　　　　Specification of Letters Patent.　　Patented Nov. 16, 1915.

Application filed September 15, 1914. Serial No. 861,795.

*To all whom it may concern:*

Be it known that I, BRONSON BARLOW, a citizen of the United States, and a resident of Chicago, in the county of Cook and State of Illinois, have invented a new and Improved Culture-Starter-Mailing Packet and Method for Making the Same, of which the following is a full, clear, and exact description.

My invention relates to pure-culture starters, and has reference more particularly to a culture starter for making butter and cheese.

The object of the invention is to provide a culture starter which is easy and inexpensive to prepare, which is compact and therefore costs little to transmit through the mail, and which combines in itself both a culture and a simple and efficient means of propagation.

Culture carriers at present in use have no purpose further than to contain and to protect the culture in transportation, while my carrier serves also as a safe and convenient instrument and means of propagation. The sack which contains the culture is carried forward in the daily propagation, and thus when pasteurized milk is used the center of pure growth is transferred and not an average mixed sample as is the case with starters at present in use. Living bacteria are present in pasteurized milk and they sometimes increase until a gassy starter results or a starter which is off flavor. If this condition is not observed and corrected promptly heavy loss may result. With my starter this cannot happen so readily as with starters now in use, because the center of pure growth is transferred. The culture carriers now on the market require a more costly outside wrapper, which is so large and heavy that the culture cannot be contained in an ordinary envelop. My culture starter obviates the above defects, as the combined package which it forms is so small, soft, pliable and light that several of such packages can be inclosed in an ordinary envelop, together with printed matter and correspondence.

Reference is to be had to the accompanying drawings forming a part of this specification, in which like characters indicate corresponding parts in all the views and in which:

Figure 1 is a perspective view of the culture starter proper; Fig. 2 is a cross section thereof on line 2—2, Fig. 1; Fig. 3 is a perspective view showing the sealed sack to be wrapped in sterilized paper; Fig. 4 is a perspective view showing the sack wrapped and encompassed by the free end of the thread and sealed; Fig. 5 is a perspective view of the sealed package wrapped in a sterilized paper carrying the directions for use; and Fig. 6 is a sectional perspective view showing a mailing envelop containing two packages of culture starters and some printed matter and correspondence.

The method of preparing the culture starter is as follows: The original culture is isolated from milk, butter or cheese of excellent quality by means of poured plates, using the methods known in the science of bacteriology. It is propagated in sterilized milk or any other favorable liquid medium. When growth has taken place the culture is mixed with or added to some dry, sterile absorbent material 7, or to a mixture of absorbent materials, enough of the absorbent material being used to make the package dry externally. The absorbent material may be saw-dust or crushed grain, such as cornmeal or starch. The absorbent material containing the culture is then placed into small, narrow sacks 8 formed from cloth, preferably cotton. These sacks are sterilized in dry heat and each is tied with a long thread 9, the major part 10 of which is left free. The sterilized sack can first be filled with the absorbent material and then the culture introduced thereinto by any suitable means. When the culture is placed into the absorbent contained in the sack, care is taken that the culture should not wet the sack through the absorbent. The filled sacks 8, with their ends sealed by the thread 9, are then wrapped or folded in a sterilized parchment paper 11 with the end 10 of the thread projecting out of the wrapper. The projecting portion of the thread is made to encompass the wrapped sack 8, as shown best in Fig. 4, and a seal 12 is applied over the thread and the parchment paper. The extremity of the thread is preferably left free so that the seal can be easily broken by pulling on the end of the thread. The seal is preferably of wax. The so-sealed package of the parchment paper containing the sack which carries the culture is then inclosed in a sterilized sheet of printed directions 13 and an elastic band 14 made to encompass the so-formed package. The whole package is then inclosed in an outer or mailing envelop, which envelop 15 may contain also a return envelop, an order sheet and a letter, and the gross weight will be less than two ounces. In Fig. 6 the mailing envelop 15 contains two packages as shown in Fig. 5, a return envelop 16, and an order sheet 17, and the gross weight of the entire mailing package, as shown in Fig. 6, is two ounces.

To use the pure culture starter, it is unwrapped from the direction paper 13, when the free end of the thread is reached. By pulling on this free end of the thread the seal 12 is broken, the thread will unwind from the parchment wrapper 11, and by continuing to pull on the string the culture sack is withdrawn from its parchment wrapper 11 and will hang suspended on the thread. It can then be lowered into an ordinary pint or quart milk bottle of sterilized or pasteurized sweet milk and held at any desired depth in the milk by placing a cotton plug in the mouth of the bottle. The bottle containing the milk and the culture is then set in a warm place. When the milk sours and sets in a curd, the cotton plug is removed and the pendant culture sack is lifted out and lowered into a second similar bottle of sterilized sweet milk; and in this way the culture is propagated daily from bottle to bottle.

From the above description it will be seen that my culture starter costs less to manufacture than others and that it can be transmitted through the mail as first-class mail matter, together with printed directions and other correspondence, at a minimum charge for postage. It is, further, a safe and instant means of transferring a culture. One has merely to lift it on its string from one milk bottle and lower it into another, without having any contact with the culture propagator itself.

From the foregoing description, taken in connection with the accompanying drawings, the advantage of my pure culture starter package and the method of preparing the same will be readily understood by those skilled in the art to which the invention pertains, and while I have described the method of preparation which I now consider to be the best embodiment thereof, I desire to have it understood that the disclosure is merely illustrative and that such changes may be made, if desired, as are within the scope of the appended claims.

Having thus described my invention, I claim as new and desire to secure by Letters Patent:

1. In a culture starter, a cotton sack, a pure culture in the sack, a thread sealing the sack with one end, a sterilized parchment wrapper inclosing the sack, the other end of the thread projecting out of said wrapper and adapted to encompass the wrapper inclosing the sack, means sealing the thread to the wrapper, and a sterilized paper of instructions for using the starter inclosing the sealed parchment wrapper.

2. In a culture-starter mailing package, a sack containing culture, a thread sealing the sack, a sterilized wrapper inclosing the sack, said thread projecting out of the wrapper and encompassing the same, and means sealing the thread to the wrapper.

3. In a culture-starter mailing package, a culture carrier, a thread secured to the carrier so that the carrier may be suspended by the thread, and a sealed, sterilized wrapper inclosing the carrier, with a portion of said thread projecting out of the wrapper.

In testimony whereof I have signed my name to this specification in the presence of two subscribing witnesses.

BRONSON BARLOW.

Witnesses:
JOHN D. BRAIDWOOD,
JAS. T. MALONE.

Copies of this patent may be obtained for five cents each, by addressing the "Commissioner of Patents, Washington. D. C."